United States Patent [19]

Blakley, III et al.

[11] Patent Number: 5,604,490
[45] Date of Patent: Feb. 18, 1997

[54] METHOD AND SYSTEM FOR PROVIDING A USER ACCESS TO MULTIPLE SECURED SUBSYSTEMS

[75] Inventors: George R. Blakley, III; L. Brooks Hickerson; Ivan M. Milman, all of Austin, Tex.; Robert S. Gittins, Woodland Park, Colo.; Douglas B. Scheer, Boynton Beach, Fla.; John H. Wilson, Austin, Tex.

[73] Assignee: International Business Machines Corporation, Armonk, N.Y.

[21] Appl. No.: 304,325

[22] Filed: Sep. 9, 1994

[51] Int. Cl.⁶ .................................................. G06F 12/14
[52] U.S. Cl. ...................... 340/825.31; 340/825.34; 364/DIG. 1; 395/186; 395/187.01; 395/188.01; 395/427; 395/561
[58] Field of Search ................ 340/825.31, 825.34; 395/725, 425, 186, 187.01, 188.01; 364/200, DIG. 1

[56] References Cited

U.S. PATENT DOCUMENTS

| | | | |
|---|---|---|---|
| 4,310,720 | 1/1982 | Check, Jr. | 340/825.31 |
| 4,498,131 | 2/1985 | Bratt et al. | 364/200 |
| 4,498,132 | 2/1985 | Ahlstrom et al. | 364/200 |
| 4,525,780 | 6/1985 | Bratt et al. | 364/200 |
| 4,731,734 | 3/1988 | Gruner et al. | 364/200 |

(List continued on next page.)

FOREIGN PATENT DOCUMENTS

| | | |
|---|---|---|
| 3192457 | 8/1991 | Japan . |
| 4342055 | 11/1992 | Japan . |

OTHER PUBLICATIONS

Wong, Raymond M., *A Comparison of Secure UNIX Operating Systems*, Oracle Corporation, Redwood Shores, CA 94065, pp. 322–333, 1990.

McIlroy, M. D., et al., Multilevel Security in the UNIX Tradition, *Software–Practice and Experience*, vol. 22(8), Aug. 1992, pp. 673–694.

Carson, Mark E., AIX Security Services [AIX project, S126], IBM Federal Sector Division, 182/3F43, Gaithersburg, MD 20879, USA, pp. 103–118. No Date.

Siil, Karl A., *Adapting Applications to Multi–Level Secure UNIX Systems*, AT&T Bell Laboratories, 1 Whippany Road, Whippany, NJ 07981, USA, Information Security, DT Lindsay and W.L. Price (Eds), Elsevier Science Publishers B.V. (North–Holland), 1991 IFIP, pp. 325–335.

(List continued on next page.)

*Primary Examiner*—Michael Horabik
*Assistant Examiner*—William H. Wilson, Jr.
*Attorney, Agent, or Firm*—Jeffrey S. LaBaw; Andrew J. Dillon

[57] ABSTRACT

An improvement relating to the security of an operating system for either a stand alone computer system or for a networked computer system. The operating system provides improved security for programs available on the computer system having different security protocols. The operating system unifies these security protocols for each user based on unique user credentials. The system operates, upon request to start a program procedure by the user, to authenticate the identity of the user based on information unique to that user. Following which, the system generates a user handle associated with the user. The system then notifies each of the security protocols of the user handle associated with the user. The system then generates new user credentials for each of the security protocols. These user credentials are associated with the user handle and then the user handle is mapped to the unique user's credentials for each program procedure. Once this is accomplished, the system invokes an alternate process and tags the process with the user handle. Once a request from the alternate process for access to an object accessed through the server is requested, the system then grants access to the object based on the new user credentials associated with the user handle. The new user credentials are typically based on an association of the user identifier, the user handle, and the unique user credentials from before.

26 Claims, 5 Drawing Sheets

5,604,490
Page 2

U.S. PATENT DOCUMENTS

| | | | |
|---|---|---|---|
| 4,742,450 | 5/1988 | Duvall et al. | 364/200 |
| 4,951,249 | 8/1990 | McClung | 340/825.34 |
| 5,018,096 | 5/1991 | Aoyama | 340/825.31 |
| 5,060,263 | 10/1991 | Bosen et al. | 340/825.31 |
| 5,187,790 | 2/1993 | East et al. | 395/725 |
| 5,202,997 | 4/1993 | Arato | 395/725 |
| 5,235,642 | 8/1993 | Wobber et al. | 380/25 |
| 5,239,583 | 8/1993 | Parrillo | 340/825.31 |
| 5,239,648 | 8/1993 | Nukui | 395/600 |
| 5,241,594 | 8/1993 | Kung | 380/4 |
| 5,261,102 | 11/1993 | Hoffman | 340/825.31 |
| 5,263,158 | 11/1993 | Janis | 340/825.31 |
| 5,276,901 | 1/1944 | Howell et al. | 340/825.31 |
| 5,280,581 | 1/1994 | Bathrick et al. | 340/825.34 |
| 5,287,519 | 2/1994 | Dayan et al. | 340/825.31 |
| 5,305,456 | 4/1994 | Boitana | 395/700 |
| 5,321,841 | 6/1994 | East et al. | 364/DIG. 1 X |
| 5,339,403 | 8/1994 | Parker | 395/425 |
| 5,359,660 | 10/1994 | Clark et al. | 340/825.34 |
| 5,450,593 | 9/1995 | Howell et al. | 340/825.31 X |

OTHER PUBLICATIONS

Thomsen, D. J., et al., *A Comparison of Type Enforcement and Unix Setuid Implementation of Well–Formed Transactions,* Secure Computing Technology Corporation, Arden Hills, MN 55112, pp. 304–312, 1990.

Herzog, Holger, et al., *Evaluation of Distributed Operating Systems in Open Networks,* Siemens AG, Germany, EurOpen '91– Tromse, 20–24 May, pp. 53–67. May 1991.

Linn, John, *Generic Security Service Application Program Interface,* Secure Systems, Digital Equipment Corp., Boxborough, MA 01719–1326, USENIX Association, UNIX Security Workshop, pp. 33–53. No Date.

METHOD AND SYSTEM FOR PROVIDING A USER ACCESS TO MULTIPLE SECURED SUBSYSTEMS

BACKGROUND OF THE INVENTION

1. Technical Field

The present invention relates, generally, to computer systems and their security, and, more particularly, to an operating system on a computer system or network having multiple secured subsystems in which a user may have access. More specifically, the present invention relates to providing a universal security system in an operating system that allows a user to access various subsystems or applications having their own specific security measures whereby the user is allowed to log onto the various subsystems using only a single security password.

2. Description of the Related Art

Many computer applications typically were written for operating systems that did not provide any security. The designers of these applications realized that a security system would be useful for certain clients and so the designers added security systems to their applications. Some of these applications are server programs that allow users to access resources on that server and to run processes on the server on their behalf. Some examples of operating systems without initial security measures are DOS, OS/2, and Macintosh OS.

In the case for OS/2, some examples of processes that allow users access include TELNET, OS/2, LAN SERVER, and NETRUN. TELNET is a program that allows multiple users to log in across a network and access an OS/2 TELNET server as if they were sitting in front of it. TELNET is part of the OS/2 TCP/IP offering. OS/2 LAN SERVER is a program that grants remote users access to resources such as, for example, files, print queues, and serial devices, on an OS/2 LAN SERVER. The NETRUN program allows remote users to execute processes on their behalf on an OS/2 LAN SERVER. Each of these programs has its own security measures.

The security support required by such programs can be split into three areas. The first is user identification authority (UIA), which establishes the association between user identification information and a process or session. This information usually includes the user's credentials, which may describe the user's identity, group memberships, administrative roles, and special privileges. A user authentication services (UAS) is the second security application. A UAS authenticates the user's identity based on information provided by the user, such as, for example, a password, signature, or token. The third security support is an access control authority (ACA), which enforces access to objects based on the credentials with which it is presented.

Since insecure operating systems do not provide these security mechanisms, any application that requires security support has to develop its own UIA, UAS, and ACA. Unfortunately, the trio of UIA, UAS and ACA developed by one application is virtually certain to be incompatible with the trio of UIA, UAS, ACA of an independently developed application. First, the credential syntax and semantics are likely to differ between different, independently developed UIA, ACA pairs. Second, one UIA, ACA pair has no way to retrieve security data created, and associated with a processor session, by an independent UIA, ACA pair.

For example, a user with the user name "LYNN," who logs onto an OS/2 server via TELNET, would not be able to access a resource owned by an OS/2 LAN SERVER on the same network, without an additional logon, because the user is not known as "LYNN" to either the UIA or ACA of the LAN SERVER. The user can only access resources managed by TCP/IP-based servers, since TELNET establishes credentials that only those users can access and understand.

Accordingly, what is needed is a system that allows for multiple different concurrently active security subsystems to coexist on a single operating system, by associating with each process information that different security subsystems can map to their own (different) views of a user's credentials.

SUMMARY OF THE INVENTION

It is therefore one object of the present invention to provide an operating system having improved security.

It is another object of the present invention to provide a security system on a computer system or network having multiple security subsystems in which a user may have access.

It is yet another object of the present invention to provide a universal security system and operating system that allows a user to access various subsystems or applications having their own specific security measures whereby the user is allowed to log onto the various subsystems using only a single security password.

The foregoing objects are achieved as is now described.

According to the present invention, an operating system for a computer system, either stand alone or networked systems, is disclosed. The operating system provides improved security for programs available on the computer system having different security protocols. The operating system unifies these security protocols for each user based on unique user credentials. The system operates, upon request to start a program procedure by the user, to authenticate the identity of the user based on information unique to that user. Following which, the system generates a user handle associated with the user. The system then notifies each of the security protocols of the user handle associated with the user. The system then generates new user credentials for each of the security protocols. These user credentials are associated with the user handle, which is mapped to the unique user's credentials for each program procedure. Once this is accomplished, the system invokes an alternate process and tags the process with the user handle. Once a request from the alternate process for access to an object accessed through the server is requested, the system then grants access to the object based on the new user credentials associated with the user handle. The new user credentials are typically based on an association of the user identifier, the user handle, and the unique user credentials from before.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
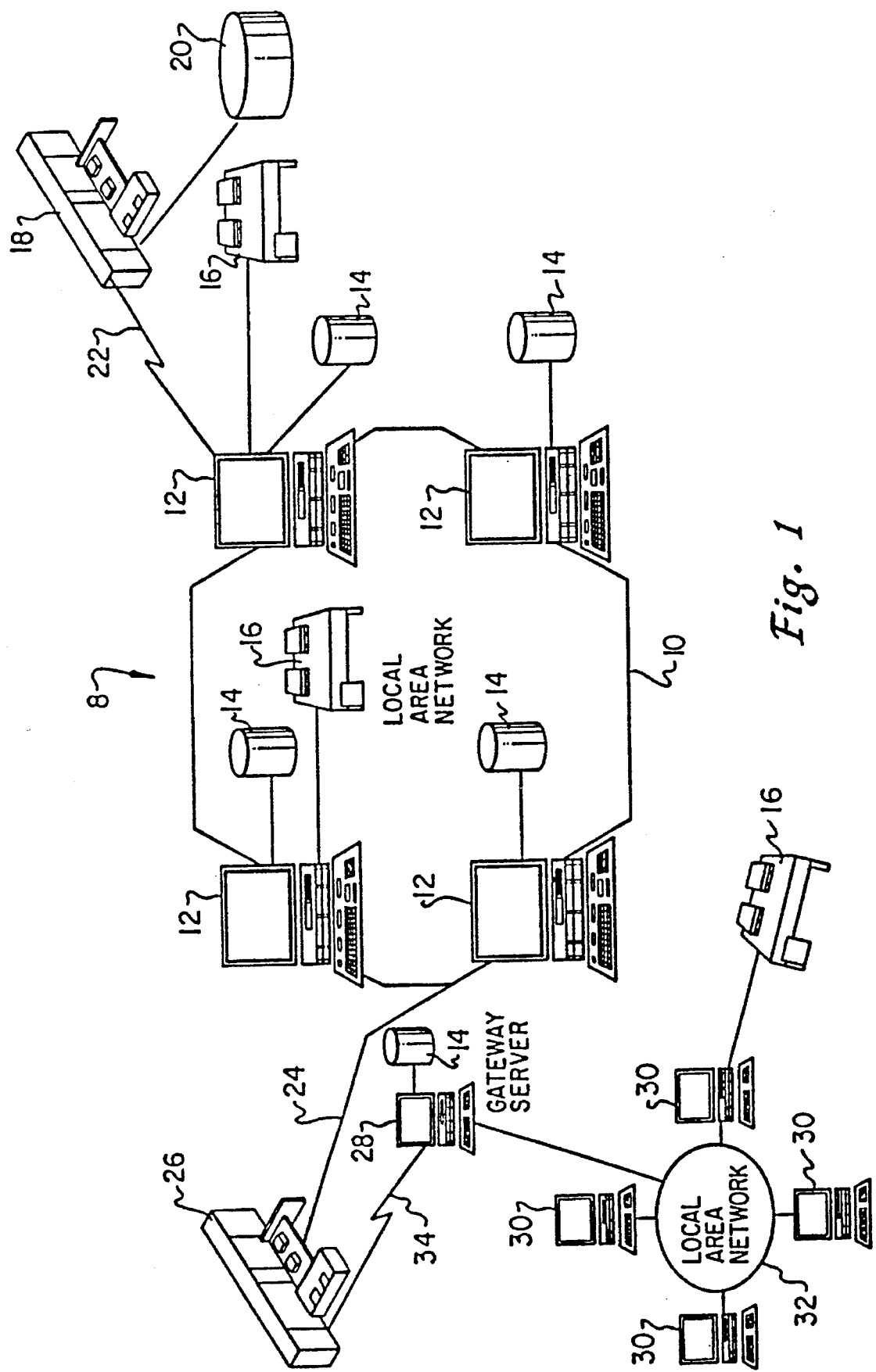
FIG. 1 depicts a networking system implementing a security system according to the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users.

Each user of the network 10 or a user of a single computer system 12, not necessarily connected to the network, is assigned specific user credentials that allows the user access onto the network system and to provide access to secured subsystems on the network. All these systems coexist under a single operating system. A unique pair of identifiers are later mapped into a subsystems view of a user's credentials. The first is a user handle, which is a 32 byte value that is unique for the duration of a user's logon session. The second is a user's name, which is a character string that is unique within a security domain for the lifetime of the user's account. The operating system, for example, OS/2, is able to generate a user handle and a given user's name for each user to have access to the network system. The operating system also is able to associate this unique pair (user handle, user name) with a process requested by the user. Next, the operating system is able to retrieve the unique pair from the processed data upon request.

Figure 2:
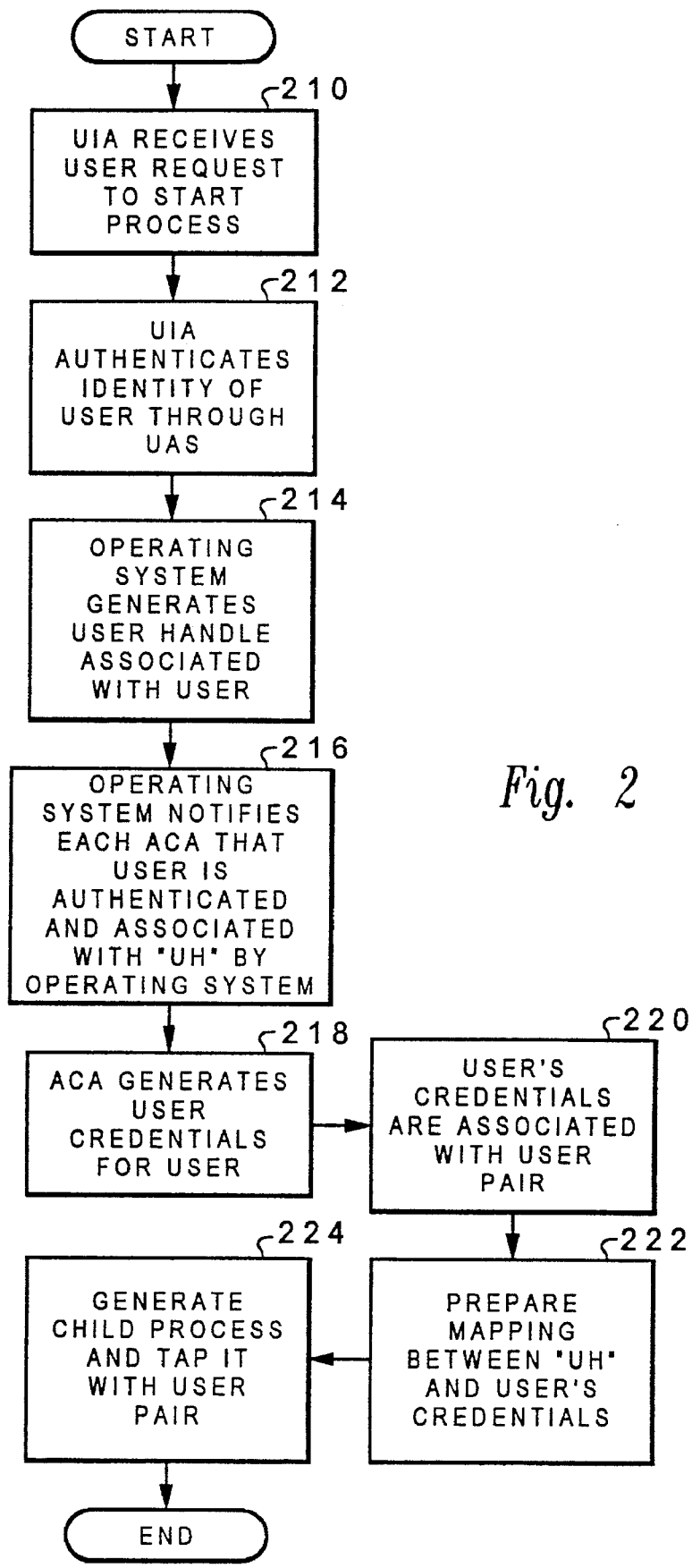
FIG. 2 is a flowchart depicting the method by which a single password and user name are used to access different security systems on the network of FIG. 1.
Figure 3A:
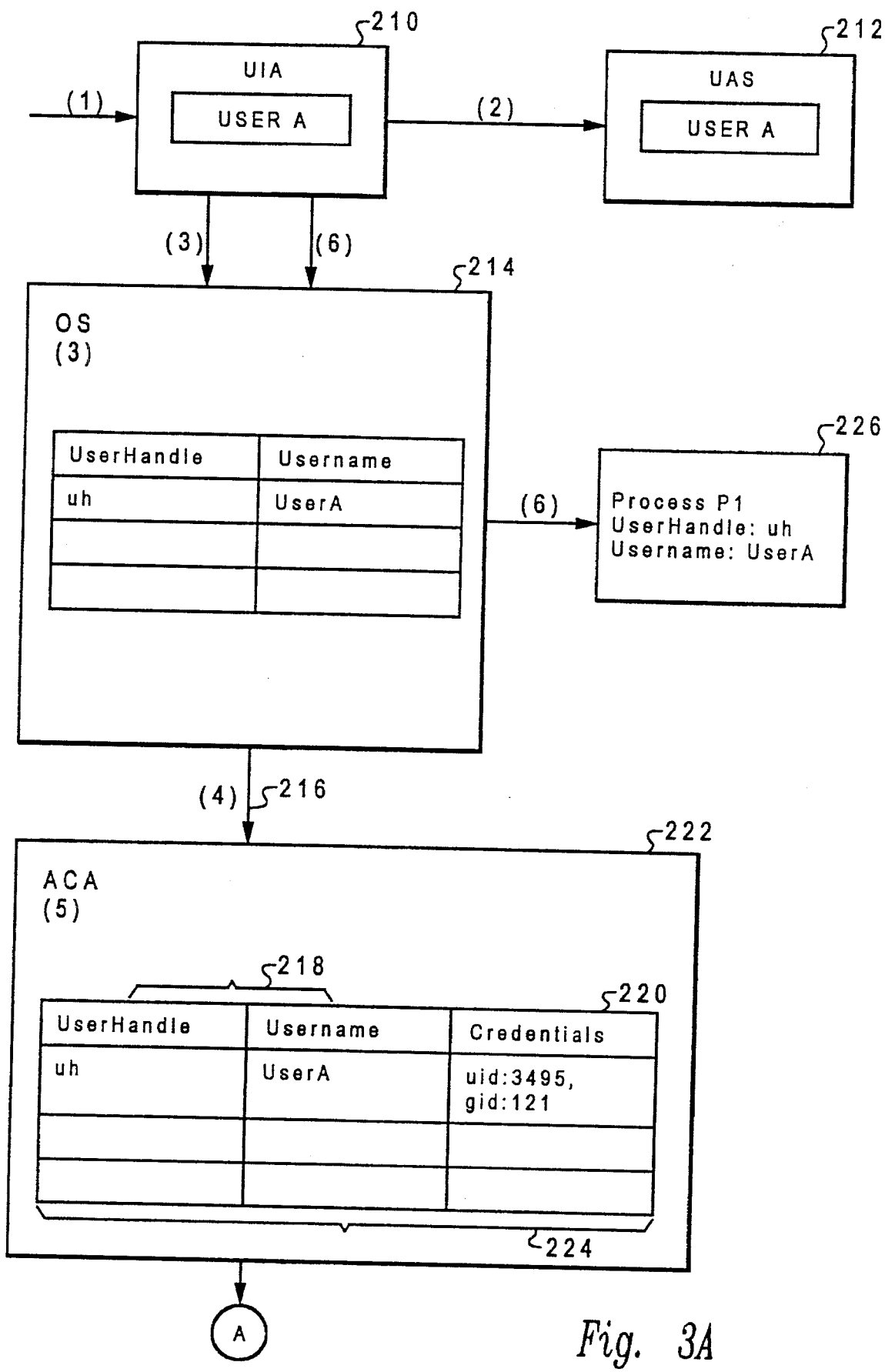
FIGS. 3A and 3B depict a block diagram of the system flow according to FIGS. 2 and 4.
Figure 3B:
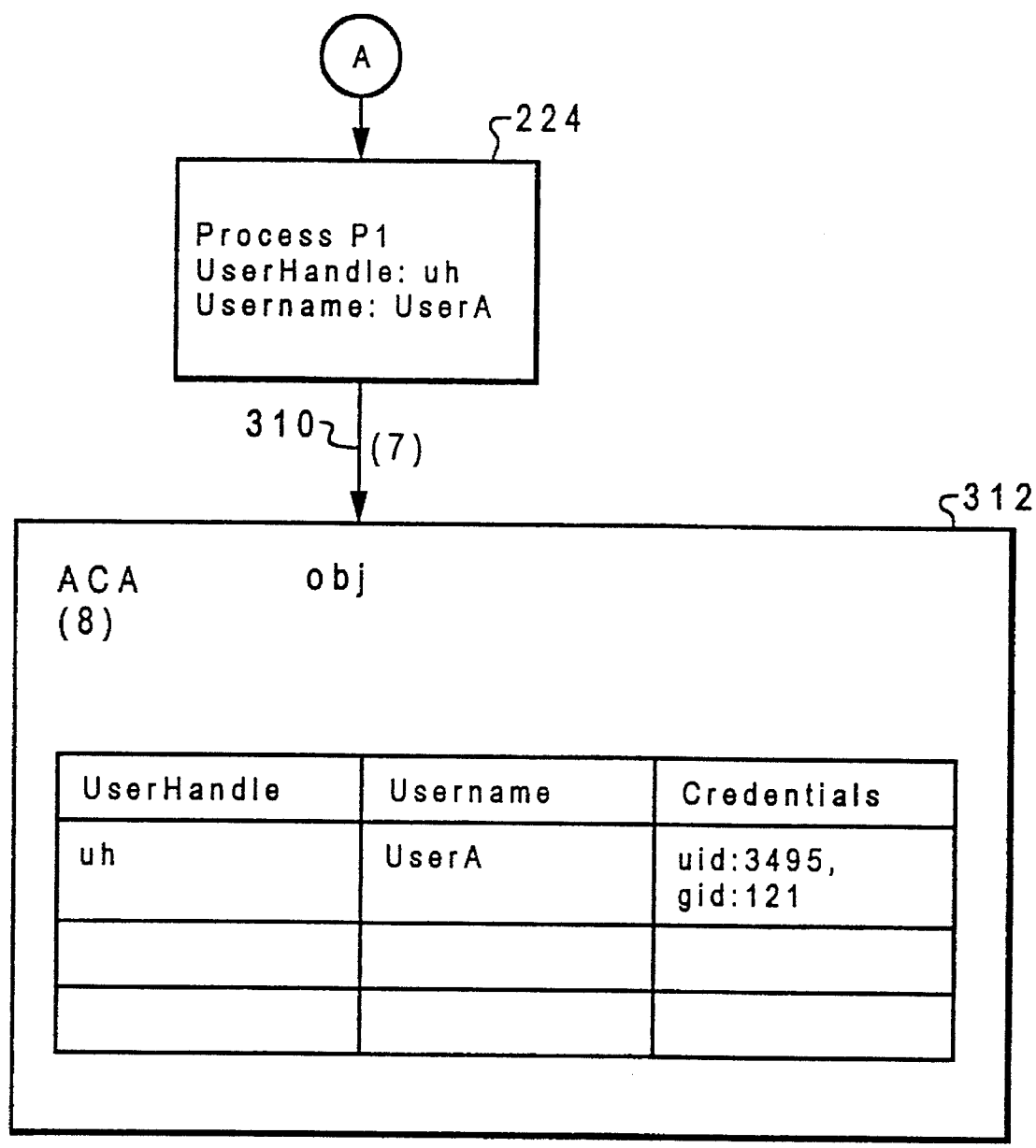

FIG. 2 is a flowchart illustrating how a UIA can use these services to associate a unique user handle, user name pair with a process, and how each ACA can map that unique pair into its own view of the user's credentials. FIGS. 3A and 3B are a block diagram, based on the operating system's control in the flowchart in FIGS. 2 and 4, and uses the same numbering identifiers in the steps of the flowcharts. At step 210, a UIA receives a request to start a process on behalf of the user identified by user name "User A". Next, at step 212, the UIA authenticates the identity of "User A" through the UAS. The UAS prompts the user for a password or other authentication data. At step 214 the UIA asks the operating system to generate a user handle "UH" and to associate it with "User A". Then, at step 216, the operating system notifies each registered ACA that "User A" has been authenticated and associated with "UH". Next, at step 218, each ACA generates the appropriate user credentials for "User A" and, at step 220, associates the user's credentials with the pair ("User A", "UH"). Once this is done, at step 222, each ACA has a mapping between "UH" and its view of "User A"'s credentials. Following this, at step 224, the UIA asks the operating system to generate a child process "P1" and tag it with the pair ("User A", "UH"). Thus completes the mapping by the operating system across the security subsystems or programs to support multiple views of the user's credentials.

Figure 4:
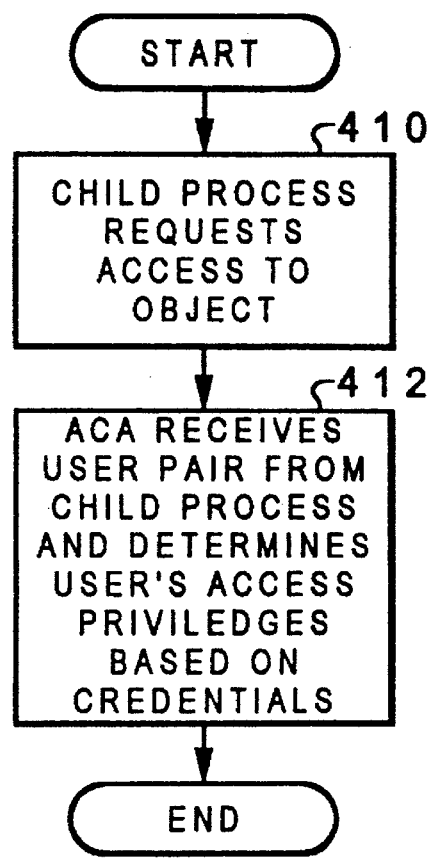
FIG. 4 is a flowchart depicting the operating of the child process according to the present invention.

FIG. 4 illustrates a flowchart depicting how the child process "P1" obtains access to the security subsystems programs. First, at step 410, the "P1", which acts on behalf of "User A", requests access to an object "OBJ". Then, at step 412, the ACA, which owns "OBJ", receives the pair ("User A", "UH") from "P1"'s process data and determines "User A"'s access privileges based on the credentials it has associated with ("User A", "UH") and whatever rights User A has been given to OBJ.

This security method works for all subsystems since the security administrator insures that the user names applied in step 210 represents the same user to all security subsystems on the system.

Figure 5:
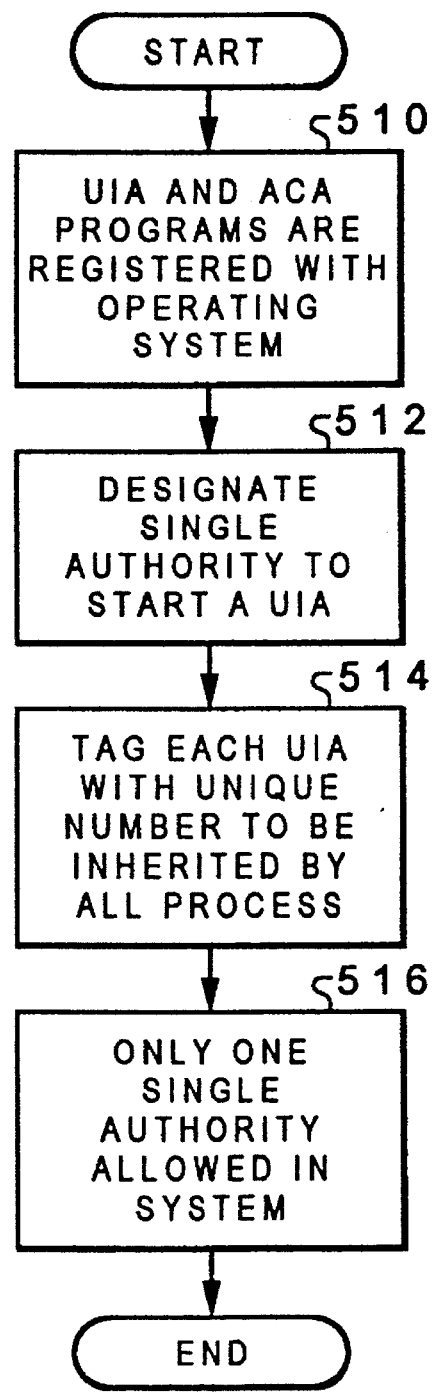
FIG. 5 depicts a flowchart of the operational hierarchy used in FIGS. 2–4.

The UIA has unlimited authority to create processes that can act on behalf of a user and an ACA has unlimited authority to determine whether or not to grant access to resources. Accordingly, to guarantee the integrity of the security subsystem facilities, the operating system must provide a means to limit which processes can be designated as UIA's and ACA's. This is accomplished by the process depicted by the flowchart in FIG. 5. First, at step 510 all UIA and ACA programs must be registered with the operating system by the security administrator. By limiting access to the UIA in access register files and program files, the security administrator insures that the integrity of the UIA and ACA programs is preserved. Next, at step 512, a single trusted process "the Security Daemon Process" (SDP) is assured of being the only process that has the authority to start a UIA. At step 514, each UIA is tagged with a unique UIA number that is inherited by all processes in all process trees created from the UIA. Finally, at step 516, the operating system must only allow one SDP in the system; by limiting access to the configuration files, the security administrator can guarantee that the correct program is designated as the SDP.

The invention provides for a means or method to associate a user handle, which is unique for the duration of the user's logon session, with each system process. By allowing each security subsystem to associate its own user's credentials with a user handle, the invention allows multiple concurrent security subsystems to coexist on the same operating system. Moreover, by providing mechanisms to control and track the modification and execution of the security subsystems components, the operating system facilitates the interoperation of multiple current security subsystems without sacrificing its integrity.

While the invention has been particularly shown and described with reference to a preferred embodiment, it will be understood by those skilled in the art that various changes in form and detail may be made therein without departing from the spirit and scope of the invention.

We claim:

1. In a computer networking system having a server coupled to a plurality of clients, wherein each of said plurality of clients has access to a plurality of program procedures, accessed through said server, each said program procedure having a security protocol required for access, unique to each user of each of said plurality of clients, a method for unifying said security protocols for each user based on unique user credentials comprising the steps of:

upon request to start a program procedure by said user, authenticating the identity of said user based on information unique to said user;

generating a user handle associated with said user;

notifying each of said security protocols of said user handle associated with said user;

generating new user credentials for each of said security protocol;

associating said new user credentials with said user handle associated with said user;

mapping said user handle to said unique user's credentials for each program procedure;

generating an alternate process;

tagging said alternate process with said user handle associated with said user;

upon request from said alternate process for access to an object accessed through said server, granting access to said object based on said new user credentials associated with said user handle.

2. The method according to claim 1 wherein said user handle associates with said user via a user identifier.

3. The method according to claim 2 wherein said new user credentials is based on the association of said user identifier, said user handle, and said unique user credentials.

4. The method according to claim 1 wherein said alternate process acts in behalf of said user.

5. In a computer system having a plurality of program procedures, accessed through a server, each said program procedure having a security protocol required for access, unique to each user of each of said plurality of program procedures, a method for unifying said security protocols for each user based on unique user credentials comprising the steps of:

upon request to start a program procedure by said user, authenticating the identity of said user based on information unique to said user;

generating a user handle associated with said user;

notifying each of said security protocols of said user handle associated with said user;

generating new user credentials for each of said security protocol;

associating said new user credentials with said user handle associated with said user;

mapping said user handle to said unique user's credentials for each program procedure;

generating an alternate process;

tagging said alternate process with said user handle associated with said user;

upon request from said alternate process for access to an object accessed through said server, granting access to said object based on said new user credentials associated with said user handle.

6. The method according to claim 5 wherein said user handle associates with said user via a user identifier.

7. The method according to claim 6 wherein said new user credentials is based on the association of said user identifier, said user handle, and said unique user credentials.

8. The method according to claim 5 wherein said alternate process acts in behalf of said user.

9. In a computer system having a plurality of program procedures, accessed through a server, each said program procedure having a security protocol required for access, unique to each user of each of said plurality of program procedures, a security system for unifying said security protocols for each user based on unique user credentials comprising:

means for authenticating the identity of said user based on information unique to said user;

means, coupled to said authenticating means, for generating a user handle associated with said user;

means, coupled to said generating means, for notifying each of said security protocols of said user handle associated with said user;

means, coupled to said authenticating means, for generating new user credentials for each of said security protocol;

means, coupled to said new user credentials generating means, for associating said new user credentials with said user handle associated with said user;

means, coupled to said associating means, for mapping said user handle to said unique user's credentials for each program procedure;

means, coupled to said mapping means, for generating an alternate process;

means, coupled to said alternate process generating means, for tagging said alternate process with said user handle associated with said user;

means, coupled to said tagging means, for granting access to said object based on said new user credentials associated with said user handle.

10. The system according to claim 9 wherein said user handle associates with said user via a user identifier.

11. The system according to claim 10 wherein said new user credentials is based on the association of said user identifier, said user handle, and said unique user credentials.

12. The system according to claim 9 wherein said alternate process acts in behalf of said user.

13. The system according to claim 9 wherein said granting means acts upon request from said alternate process for access to an object accessed through said server.

14. In a computer networking system having a server coupled to a plurality of clients, wherein each of said plurality of clients has access to a plurality of program procedures accessed through said server, each said program procedure having a security protocol required for access, unique to each user of each of said plurality of clients, a method for unifying said security protocols for each user based on unique user credentials comprising the steps of:

authenticating the identity of said user based on information unique to said user;

generating a user handle associated with said user;

notifying each of said security protocols of said user handle associated with said user;

generating new user credentials for each of said security protocols;

associating said new user credentials with said user handle associated with said user;

mapping said user handle to said unique user's credentials for each program procedure; and providing access to a requested program to a user base upon the mapping of said user handle to said unique user's credentials, said step of providing access to a requested program further comprising the steps of:

generating an alternate process;

tagging said alternate process with said user handle associated with said user; and generating access to said object.

15. The method according to claim 14 wherein said user handle associates with said user via a user identifier.

16. The method according to claim 15 wherein said user credentials are based on the association of said user identifier, said user handle, and said unique user credentials.

17. In a computer networking system having a server coupled to a plurality of clients, wherein each of said plurality of clients has access to a plurality of program procedures accessed through said server, each said program procedure having a security protocol required for access, unique to each user of each of said plurality of clients, a method for unifying said security protocols for each user based on unique user credentials comprising the steps of:

authenticating the identity of said user based on information unique to said user;

generating a user handle associated with said user;

notifying each of said security protocols of said user handle associated with said user;

generating new user credentials for each of said security protocols;

associating said new user credentials with said user handle associated with said user;

mapping said user handle to said unique user's credentials for each program procedure; and generating an alternate process based on the mapping of said user handle to said unique user's credentials for each program procedure, wherein said user handle associates with said user via a user identifier.

18. In a computer system having a plurality of program procedures, accessed through a server, each said program procedure having a security protocol required for access, unique to each user of each of said plurality of program procedures, a method for unifying said security protocols for each user based on unique user credentials comprising the steps of:

authenticating the identity of said user based on information unique to said user;

generating a user handle associated with said user;

notifying each of said security protocols of said user handle associated with said user;

generating new user credentials for each of said security protocol;

associating said new user credentials with said user handle associated with said user;

mapping said user handle to said unique user's credentials for each program procedure; and providing access to a requested program to a user based upon the mapping of said user handle to said unique user's credentials, wherein this step further comprises the steps of:

generating an alternate process;

tagging said alternate process with said user handle associated with said user; and granting access to said object.

19. The method according to claim 18 wherein said user handle associates with said user via a user identifier.

20. The method according to claim 19 wherein said new user credentials is based on the association of said user identifier, said user handle, and said unique user credentials.

21. The method according to claim 18 wherein said alternate process acts in behalf of said user.

22. In a computer system having a plurality of program procedures, accessed through a server, each said program procedure having a security protocol required for access, unique to each user of each of said plurality of program procedures, a security system for unifying said security protocols for each user based on unique user credentials comprising:

means for authenticating the identity of said user based on information unique to said user;

means, coupled to said authenticating means, for generating a user handle associated with said user;

means, coupled to said generating means, for notifying each of said security protocols of said user handle associated with said user;

means, coupled to said authenticating means, for generating new user credentials for each of said security protocol;

means, coupled to said new user credentials generating means, for associating said new user credentials with said user handle associated with said user;

means, coupled to said associating means, for mapping said user handle to said unique user's credentials for each program procedure; and means for providing access to a program using selected results from said mapping of said user handle to said unique user's credentials, said means for providing access further comprising:
- means, coupled to said mapping means for generating an alternate process;
- means, coupled to said alternate process generating means, for tagging said alternate process with said user handle associated with said user; and
- means, coupled to said tagging means, for granting access to said object.

23. The system according to claim 22 wherein said user handle associates with said user via a user identifier.

24. The system according to claim 23 wherein said new user credentials are based on the association of said user identifier, said user handle, and said unique user credentials.

25. The system according to claim 22 wherein said alternate process acts in behalf of said user.

26. The system according to claim 22 wherein said granting means acts on request from said alternate process for access to an object accessed through said server.

* * * * *